(12) United States Patent
Bebesel et al.

(10) Patent No.: US 8,037,981 B1
(45) Date of Patent: Oct. 18, 2011

(54) DEVICE AND PROCESS FOR OSCILLATION INSULATION IN A TRANSMISSION PATH

(75) Inventors: Marius Bebesel, Munich (DE); Peter Jänker, Riemerling (DE); Rudolf Maier, Miesbach (DE); Henning Strehlow, Munich (DE)

(73) Assignees: EADS Deutschland GmbH, Ottobrunn (DE); Eurocopter Deutschland GmbH, Donauworth (DE)

( * ) Notice: Subject to any disclaimer, the term of this patent is extended or adjusted under 35 U.S.C. 154(b) by 1800 days.

(21) Appl. No.: 10/838,233

(22) Filed: May 5, 2004

Related U.S. Application Data (63) Continuation of application No. PCT/DE02/04080, filed on Nov. 4, 2002.

(30) Foreign Application Priority Data

Nov. 6, 2001  (DE) .................................. 101 54 391

(51) Int. Cl.
 *F16F 15/00* (2006.01)
(52) U.S. Cl. .................. 188/266.7; 267/136; 267/140.15
(58) Field of Classification Search .............. 188/266.7; 267/140.11, 140.14, 140.15, 136
See application file for complete search history.

(56) References Cited

U.S. PATENT DOCUMENTS

| | | | |
|---|---|---|---|
| 5,348,124 A | 9/1994 | Harper | |
| 5,497,043 A | 3/1996 | Leung et al. | |
| 5,542,230 A | 8/1996 | Schutze | |
| 5,853,144 A | 12/1998 | Vincent | |
| 6,105,900 A | 8/2000 | Welsh et al. | |
| 6,138,947 A | 10/2000 | Welsh et al. | |
| 6,224,014 B1 | 5/2001 | Dussac | |
| 6,364,064 B1 | 4/2002 | Rizzi | |
| 6,480,609 B1 | 11/2002 | Strehlow et al. | |
| 2002/0134628 A1 | 9/2002 | Schnur et al. | |

FOREIGN PATENT DOCUMENTS

| | | |
|---|---|---|
| DE | 4008568 | 9/1990 |
| DE | 19812748 | 8/1999 |
| DE | 19813959 | 9/1999 |
| DE | 10001159 | 7/2001 |
| DE | 10110822 | 9/2002 |
| EP | 0470064 | 2/1992 |
| EP | 0774411 | 5/1997 |
| EP | 1132647 | 9/2001 |
| FR | 2761437 | 10/1998 |
| WO | 03/040587 | 5/2003 |

OTHER PUBLICATIONS

English Language abstract of EP 0470 064, published Feb. 5, 1992.

*Primary Examiner* — Bradley King
(74) *Attorney, Agent, or Firm* — Greenblum & Bernstein, P.L.C.

(57) ABSTRACT

Device and process for oscillation insulation in a transmission path. The device includes a first body structured and arranged to undergo an oscillation movement, at least one rigid connection element, a second body connected to the first body via the at least one rigid connection element, and an actuator device attached to the at least one connection element. A sensor unit is arranged in an interface area of the at least one connection element, and a regulator unit, connected to the sensor unit, is arranged to control the actuator device to perform an elastic deformation equivalent to an oscillation movement of the first body. The instant abstract is neither intended to define the invention disclosed in this specification nor intended to limit the scope of the invention in any way.

37 Claims, 5 Drawing Sheets

DEVICE AND PROCESS FOR OSCILLATION INSULATION IN A TRANSMISSION PATH

CROSS-REFERENCE TO RELATED APPLICATIONS

The present application is a continuation of International Application No. PCT/DE02/04080 filed Nov. 4, 2002, the disclosure of which is expressly incorporated by reference herein in its entirety. Moreover, the instant application claims priority of German Patent Application No. 101 54 391.3 filed Nov. 6, 2001.

BACKGROUND OF THE INVENTION

1. Field of the Invention

The present invention relates to a device and process for oscillation insulation in a transmission path having a first body that performs an oscillation movement, a second body that is connected to the first body via at least one rigid connection element, an actuator device that is arranged on the at least one connection element, a sensor unit, and a regulator unit. The invention is used for oscillation reduction or vibration reduction in helicopters.

2. Discussion of Background Information

The problem of the transmission of oscillation movements of a vibrating body to a second body connected thereto via a rigid connection element occurs in technology wherever machine vibrations and machine oscillations are generated by a source. The transmission of these oscillations and vibrations (usually called structure-borne noise) to elements rigidly connected to the source is hereby very disturbing in general.

As is known, in helicopters the main transmission gear is connected via several support structures, the so-called struts, to the upper side of the cell structure of a cockpit. This support structure or the strut are to be considered in a generalized manner as a connection element. This is thereby a rigid connection element. This connection element represents a transmission path. The main transmission gear and engine, rotor and auxiliary units generate vibrations that are passed into the cell structure of the cockpit via the struts. The disturbing high-frequency gearing vibrations are the determining factor for noise disturbance and arise through gear tooth engagement. A gearing has several pairs of gear wheels, the engagement of which leads to marked oscillations and the associated noise peaks at discrete frequencies in the range of approx. 500-4000 Hz. These noise peaks often exceed the background noise in the helicopter by 10-20 dB (FIG. 1) and thus also dominate the overall noise level. In addition, discrete frequencies are experienced as very disturbing, even if the noise level is otherwise at a low level. Further i.a. discrete frequencies are generated by the engine, the rotor and auxiliary units and likewise passed into the cabin via the gearing struts. The overall noise level (integrated over the entire frequency range) in a conventional standard helicopter is between 85-90 dBA. The gearing-induced vibrations are thus the main cause of serious noise disturbance in the cockpit.

Various arrangements and systems have been proposed to reduce this noise disturbance. U.S. Pat. No. 6,105,900 and U.S. Pat. No. 6,138,947, for example, describe an active noise control system that minimizes the undesirable acoustic noise in a helicopter cockpit. This noise is caused to a great extent by vibrations of the main transmission gear that is connected to the cell structure of the cockpit. The main transmission gear is connected to the cell structure of the cockpit by means of individual attachment feet. The individual attachment foot features a flange in the area of the interface between attachment foot and cell structure. An oscillation actuator for generating mechanical oscillations is in turn arranged on this flange. The oscillation actuator generates oscillations through the movement of an inertial mass, which oscillations are passed into the struts from the actuator via the flange and superimposed on the oscillations generated by the main transmission gear, so that a marked reduction of the resulting oscillation ensues from a superimposition of both oscillations. As a result, the noise is reduced in the cockpit of the helicopter. The known noise control system is thus based on a counter-control principle. The oscillations first introduced are detected and compensated for by means of a corresponding counter-vibration through destructive interference. However, this means that in any case undesirable forces are first introduced into the cockpit which forces are then compensated again through the targeted introduction of corresponding counter-forces that are fed in via an intake surface of the flange acting virtually in a selective manner. The known noise control system thus has the disadvantage that in any case the support structure (strut) and the cell structure of the cockpit are acted on with forces. Furthermore, the relatively high weight of the oscillation actuators is disadvantageous. It is also disadvantageous that several flanges are necessary on one support structure.

U.S. Pat. No. 6,224,014 B1 describes the reduction of noise that occurs in the helicopter due to various vibration sources (gearing, engine, rotor). The actuators are oscillation actuators that have an inertial mass to be moved. The vibration force generated by the oscillation actuator is destructively superimposed on the disturbing oscillation and not insulated from the cell structure.

European Patent Application No. EP 0 774 411 takes into consideration purely the reduction of vibration and not the reduction of noise in the cockpit which is caused by the higher-frequency oscillations of the main transmission gear. The known document considers oscillations that occur through the rotating main rotor (column 9, line 39 ff). These oscillations lie at fairly low frequencies (approx. 20-30 Hz) and are therefore not relevant in terms of noise.

Furthermore, German Patent Application No. DE 198 13 959 A1 discloses a device for suppressing structure-borne noise that reduces the transmission of machine vibrations and machine oscillations through a support structure to a cell or a component with the simplest possible construction and with relatively low integration costs. There, too, the cell or the component is, e.g., the cockpit of a helicopter. DE 198 13 959 A1 teaches that the device for structure-borne noise suppression contains at least one piezo actuator that introduces oscillations into the support structure in order essentially to block the structure-borne noise transmission path to the structure to be insulated and to compensate for the noise excitation more effectively by means of the available and excited system dimensions of the noise generator. The piezo actuator installed on the support structure thereby effects a force introduction over a relatively large surface area of the support structure. The support structure can be arranged, e.g., between the main transmission gear of a rotor and a cell structure of the cockpit of a helicopter. In this case the support structure is embodied as one or more gearing struts. The piezo actuator is arranged essentially along the entire circumference of the strut and has a defined extension in the axial direction of the strut.

However, German Patent Application No. DE 198 13 959 A1 does not provide any information on how such a device for suppressing structure-borne noise can be effectively used in an overall system or on how the regulation and control occur, taking into consideration the interaction of the individual parts and components in an overall system.

SUMMARY OF THE INVENTION

The present invention is concretely derived from helicopter construction and can be generalized on the basis of its fundamental approach for mechanical engineering in general.

The present invention creates a device and a method for oscillation insulation in a transmission path, which device or method with the simplest possible equipment effectively reduces or, if possible, completely avoids the transmission of oscillations of a first body to a second body rigidly connected thereto in an overall system primarily in order to prevent the passing of oscillations into the second body.

According to the invention, a sensor unit, arranged in an interface area of a connection element and a second body, is connected to a regulator unit, and an actuator device can be controlled by the regulator unit such that, as a function of the output of the sensor unit, the actuator device performs an elastic deformation equivalent to the oscillation movement of the first body. Thus, the form of the connection element can be changed in one section in order to follow the oscillation movement of the first body so that the oscillation movement of the first body is effectively insulated from the second body. This concept ultimately leads to a compensation of the disturbance through the movement of the first body, which is usually called nodal isolation.

In this manner, through a suitable control of the actuator device based on the measurement of an actuating value on the sensor unit, an effective reduction of the oscillation transmission is achieved. Furthermore, the device has the advantage that it can be implemented with relatively simple technical means, which particularly in an overall system leads to a considerable saving of weight compared to other noise control systems.

Moreover, the device according to the invention has the advantage that it also causes an effective reduction of the oscillation transmission in a transmission path when the oscillation movement of the first body has several degrees of freedom. An effective insulation is thus possible from oscillation movements that include, e.g., longitudinal, transversal and/or torsional oscillations or corresponding combinations of these oscillation forms.

Advantageously the actuator device forms a section in the transmission path between the first and second body, whereby this section performs the elastic deformation. In this manner the compensation of the oscillation movement of the first body is concentrated on a defined limited section so that the connection element itself is stressed only within this section.

Expediently the actuator device is embodied to be actively moveable in several spatial directions according to the degrees of freedom of the oscillation movement of the first body. The deformation of the actuator device hereby corresponds respectively to a change in length in the corresponding spatial direction. Thus different oscillation forms can be compensated for respectively through correspondingly embodied, arranged or activated actuator device that expand or contract depending on the spatial direction of the oscillation movement. A following of the movement of the first body is thus advantageously achieved so that the second body is held with zero force through the connection element.

Expediently the connection element is embodied or formed as a pipe-shaped or rod-shaped strut. The pipe-shaped embodiment has the advantage of saving weight compared with a rod-shaped strut. A rod-shaped strut, however, is marked by high strength and is used in particular when large masses are to be held or connected to one another.

Furthermore, it is advantageous that the connection element features an attachment eye at least in the interface area to the second body. It is thereby expedient to connect the connection element to the second body at the attachment eye via a bolt arrangement. Such an attachment by means of attachment eye and bolt arrangement renders possible a simple and low-maintenance type of attachment.

According to one embodiment, the actuator device is arranged on the outer and/or inner circumference of the pipe-shaped connection element or on the outer circumference of the rod-shaped connection element by means of adhesion, sputtering or other suitable means. The attachment inside the pipe-shaped connection element exhibits an extremely space-saving arrangement. An attachment on the outer circumference is advantageous in particular for retrofitting already existing connection elements.

According to a further embodiment, the actuator device on the outer and/or inner circumference of the pipe-shaped connection element or on the outer circumference of the rod-shaped connection element are arranged via respective driven elements. The arrangement possibilities on the outer and/or inner circumference hereby feature the same advantages as with the actuator device attached by means of adhesion or sputtering. Providing driven elements has the advantage that the active area of the actuator device or the effect of the actuator device on the connection element is increased.

According to a particularly preferred embodiment, the actuator device is integrated into the pipe-shaped or rod-shaped connection element. This has the advantage of a compact and extremely space-saving arrangement. Contrary to previous views, such an arrangement can be used even when the connection element has to have great strength to hold large masses.

According to a further embodiment, the actuator device is arranged on the inner circumferential surface of the attachment eye. Such an arrangement is advantageous in view of the alignment of the actuator device according to the degrees of freedom of the oscillation movement of the first body. In this embodiment, the actuator device can thus be aligned in the corresponding spatial directions in a particularly simple manner.

Advantageously, the actuator device is embodied by sections or subdivided. A particularly simple assignment of the individual actuator device to the corresponding degrees of freedom of the oscillation movement of the first body is thus realized.

According to an alternative embodiment, the actuator device can be controlled by sections. This has the same effect as with the embodiment of the actuator device by sections or subdivided, but in addition has the further advantage that the actuator device can be produced in one piece.

According to a further alternative embodiment, the actuator device can be arranged parallel, perpendicular and/or obliquely regarding the longitudinal direction of the connection element. This too renders possible a simple adjustment to the corresponding degrees of freedom or spatial direction of the oscillation movement of the first body.

Expediently the actuator device comprises electrostrictive, magnetostrictive, electromagnetic or electromotive material. It is particularly preferred for the actuator device to comprise a stack-shaped piezo actuator. Such actuators have in particular the advantage of small dimensions.

Furthermore it is advantageous that the sensor unit is an acceleration or expansion sensor. These sensors provide accurate measured values and can be integrated into an overall system in a space-saving manner.

The object is further attained through a method for oscillation insulation in a transmission path with a first body that carries out an oscillation movement, a second body that is connected to the first body via at least one rigid connection element, actuator device that is arranged on the at least one connection element, and a sensor unit and an actuator unit whereby a controlled variable is detected through the sensor unit arranged in the interface area of the connection element and the second body, and the controlled variable is transmitted to the regulator unit and the actuator device is regulated by the regulator unit through a corresponding correcting variable as a function of the controlled variable and is characterized according to the invention in that during the regulation the actuator device performs an elastic deformation equivalent to the oscillation movement of the first body, through which the form of the connection element can be changed in one section in order to follow the movement of the first body, and repeated until the controlled variable detected by the sensor unit is virtually zero, so that the oscillation movement of the first body is effectively insulated from the second body.

It is thereby advantageous that the controlled variable detected by the sensor unit is a gauge of the oscillation movement transmitted from the first body to the second body via the connection element.

The method for oscillation insulation in a transmission path according to various features of the invention is advantageously used in a helicopter. In this way, the transmission path is formed by at least one strut that connects the main transmission gear of a helicopter to the upper side of the cell structure of the cockpit. A piezo actuator can be arranged on at least one strut and an elastic deformation equivalent to the oscillation movement of the main transmission gear is carried out in one section of the strut by means of an adjustable piezo actuator.

Expediently the section of the strut is thereby formed by a piezo actuator arranged on the surface of the strut in its circumferential direction.

Furthermore it is advantageous that the section is formed between two driven elements of a piezo actuator arranged in the axial direction of the strut.

It is particularly preferred for the section of the strut to be formed by the piezo actuator itself.

In addition, the device for oscillation insulation in a transmission path according to the invention is particularly advantageously used in a helicopter. In this way, the transmission path is formed by at least one strut that connects the main transmission gear of a helicopter to the upper side of the cell structure of the cockpit, and a piezo actuator can be arranged on at least one strut. The manner of using of the invention provides that the measuring element of a regulator device is arranged in the area of the strut between the piezo actuator and the interface to the cell structure, and an adjustable piezo actuator that is connected to the regulator device is integrated in the strut in the axial direction.

The present invention is directed to a device for oscillation insulation in a transmission path. The device includes a first body structured and arranged to undergo an oscillation movement, at least one rigid connection element, a second body connected to the first body via the at least one rigid connection element, and an actuator device attached to the at least one connection element. A sensor unit is arranged in an interface area of the at least one connection element, and a regulator unit, connected to the sensor unit, is arranged to control the actuator device to perform an elastic deformation equivalent to an oscillation movement of the first body.

In accordance with the invention, the elastic deformation can include at least one section of the connection element being changeable in form to follow the oscillation movement of the first body. In this manner, the oscillation movement of the first body is effectively insulated from the second body.

According to another feature of the instant invention, the actuator device can be controllable by the regulator unit as a function of an output of the sensor unit.

In accordance with still another feature, the oscillation movement of the first body may include several degrees of freedom.

The actuator device can form a section in the transmission path between the first and the second body. Further, the section in the transmission path can perform the elastic deformation.

Moreover, the actuator device can be formed to be actively moveable in at least one spatial direction according to the degrees of freedom of the oscillation movement of the first body. The deformation of the actuator device can correspond to a change in length in a corresponding spatial direction.

According to another feature of the invention, the connection element can be formed as one of a pipe-shaped or rod-shaped strut. The connection element may include an attachment eye at least in the interface area to the second body. Further, the connection element may be connected to the second body at the attachment eye via a bolt arrangement. Moreover, the actuator device can be arranged on an inner circumferential surface of the attachment eye. The connection element can be a pipe-shaped connection element and the actuator element may be arranged on at least one of an outer and an inner circumference of the pipe-shaped connection element by at least one of adhesion or sputtering. The connection element can be a rod-shaped connection element and the actuator device can be arranged on an outer circumference of the rod-shaped connection element by at least one of adhesion or sputtering. Still further, the connection element can be a pipe-shaped connection element and the actuator element can be arranged on at least one of an outer and an inner circumference of the pipe-shaped connection element via respective driven elements. Also, the connection element may be a rod-shaped connection element and the actuator device may be arranged on an outer circumference of the rod-shaped connection element by via respective driven elements.

In accordance with still another feature of the invention, the actuator device can be integrated into the connection element.

According to a further feature of the invention, the actuator device can include sections or be subdivided.

According to still another feature of the present invention, the actuator device may be controllable by sections.

In accordance with another feature of the invention, the actuator device can be arranged at least one of parallelly, perpendicularly and obliquely to a longitudinal direction of the connection element.

Further still, the actuator device can be composed of one of an electrostrictive, magnetostrictive, electromagnetic or electromotive material.

According to another feature of the invention, the actuator device can be a stack-shaped piezo actuator.

In accordance with still another feature of the invention, the sensor unit may include one of an acceleration or expansion sensor.

The present invention is directed to a process for oscillation insulation in a transmission path between a first body undergoes an oscillation movement and a second body connected to the first body by at least one rigid connection element. The process includes detecting a controlled variable through a sensor unit arranged in an interface area of the connection element and the second body, transmitting the controlled variable to a regulator unit, and performing an elastic deformation equivalent to the oscillation movement of the first body. In this manner, the form of the connection element is changeable in one section in order to follow the movement of the first body.

In accordance with a feature of the present invention, the process can further include repeating the detecting, transmitting, and elastic deformation performance until the controlled variable detected by the sensor unit is virtually zero. In this way, the oscillation movement of the first body is effectively insulated from the second body.

According to another feature of the invention, the elastic deformation may include regulating an actuator device with a corresponding correcting variable that is a function of the controlled variable.

In accordance with still another feature of the invention, the actuator device can be arranged on the at least one connection element.

Still further, the controlled variable detected by the sensor unit can be a gauge of the oscillation movement transmitted from the first body to the second body via the connection element.

Moreover, the transmission path can be formed by at least one strut that connects a main transmission gear of a helicopter to an upper side of a cell structure of a cockpit. The process can also include arranging an adjustable piezo actuator on the at least one strut as the actuator device. An elastic deformation equivalent to the oscillation movement of the main transmission gear is carried out in one section of the strut by the adjustable piezo actuator. The adjustable piezo actuator can be arranged on a surface of the strut along a circumferential direction. The section may be formed between two driven elements of a piezo actuator arranged in an axial direction of the strut. Further, the section of the strut can be formed by a piezo actuator. The process can also include integrating a piezo actuator into the at least one strut in an axial as the actuator device, and locating a measuring element of the regulator unit in an area of the strut between the piezo actuator and an interface to the cell structure.

The instant invention is directed to an apparatus to perform the above-noted process. According to the invention, the sensor unit can be located in an interface area between the connection element and the second body, and the regulating unit may be connected to the sensor unit.

The present invention is directed to a process for oscillation insulation in the above-noted device. The process includes detecting a controlled variable in an interface area of the connection element and the second body, and performing an elastic deformation equivalent to the oscillation movement of the first body, whereby the form of the connection element is changeable in one section in order to follow the movement of the first body.

In accordance with still yet another feature of the present invention, the process can include repeating the detecting and elastic deformation performance until the detected controlled variable is virtually zero. In this manner, the oscillation movement of the first body can be effectively insulated from the second body.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
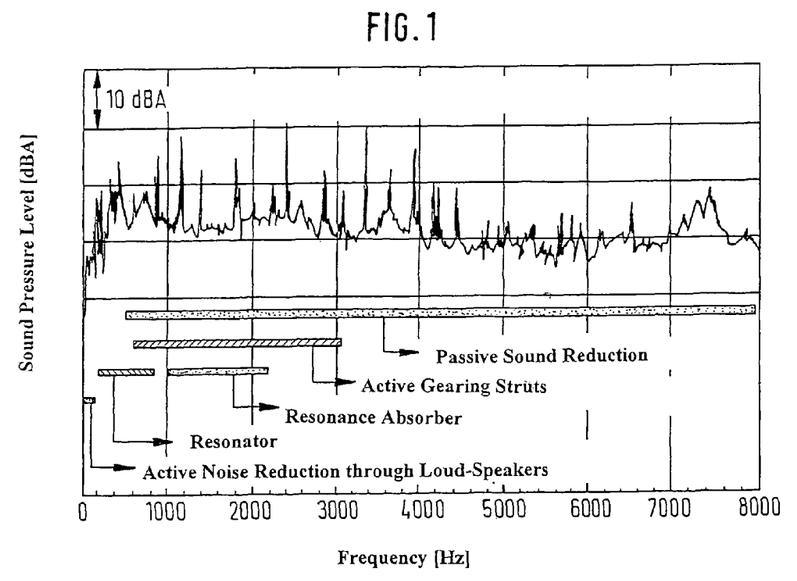
FIG. 1 illustrates a noise spectrum measured in the cockpit of a helicopter.

FIG. 1 shows the typical range of application of the invention in the frequency range between 500 Hz and 4000 Hz.

Figure 2A:
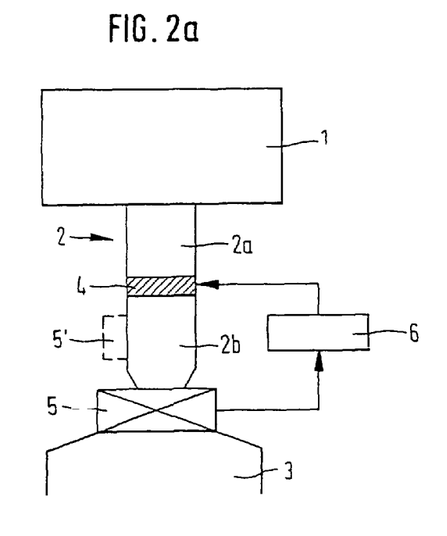
FIG. 2a diagrammatically illustrates the device according to the invention for oscillation insulation in a transmission path.

FIG. 2a shows in greatly schematized representation a device according to the invention for oscillation insulation in a transmission path. A first body 1 is hereby connected to a second body 3 via a rigid connection element 2. As a rule, the first body makes oscillation and vibration movements and is therefore also called an oscillation source below. Due to the oscillation movement of the first body, oscillations and vibrations are transmitted to the second body via the transmission path formed by the essentially rigid connection element. However, in many cases this is disturbing so that suitable precautionary measures are necessary in order to effectively eliminate this oscillation transmission. To this end actuator device is provided on the connection element 2, which actuator device is labeled with reference number 4 in FIG. 2a. Furthermore, a sensor unit 5 is provided that is arranged in principle between the actuator device 4 arranged on the connection element 2 and the second body 3. The sensor unit 5 is preferably arranged at the interface between the connection element 2 and the second body 3, as shown in FIG. 2a. In addition, the sensor unit can also be arranged, e.g., in an interface area on the connection element 2 itself, as shown in FIG. 2 by a dashed line labeled with the reference number 5'.

To operate the actuator device 4, furthermore a regulator unit 6 is provided that in turn is connected to the sensor unit 5 in order to issue a correcting signal to the actuator device 4 on the basis of the signals detected by the sensor unit 5.

Such a constellation of an oscillating first body rigidly connected to a second body is found, e.g., in helicopters. The oscillation source is thereby typically the main transmission gear. The so-called struts are used as connection element 2, which struts firmly connect the main transmission gear to the upper side of the cell structure of a helicopter cockpit. In order to reduce the noise disturbance in the cockpit explained at the outset, a transmission of the oscillation movement of the oscillation source via the struts to the cell structure has to be completely avoided if possible.

Figure 2B:
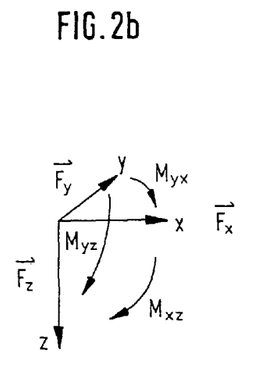
FIG. 2b illustrates a coordinate system explaining the degrees of freedom of the oscillation movement of the first body.

The oscillation movement of the first body thereby typically exhibits several degrees of freedom. These degrees of freedom contain, e.g., oscillations in the longitudinal direction of the connection element (z direction in FIG. 2b), oscillation in the transversal direction thereto (x and/or y direction in FIG. 2b) and torsional oscillations or corresponding combinations of these oscillation forms. Thus with a longitudinal oscillation of the first body, forces are introduced into the connection element in the z direction. Accordingly, with a transversal oscillation, forces are transmitted in the x and/or y direction. In FIG. 2b, these forces are labeled $F_z$, $F_x$ and $F_y$. Torsional oscillations moreover introduce corresponding moments into the connection element 2. These moments are indicated diagrammatically in FIGS. 2b and labeled $M_{xy}$, $M_{xz}$ and $M_{zy}$. Consequently, an oscillation movement of the first body 1, which exhibits, e.g., the six degrees of freedom indicated in FIG. 2b, is introduced into the connection element 2 at its interface to the first body 1. This area, which designates the connection element section between the first body and the actuator device 4 attached to the connection element 2, is labeled below as upper connection element section 2a. Accordingly, the section of the connection element 2 between the actuator device 4 and the second body 3 is labeled below as the lower connection element section 2b.

Figure 3:
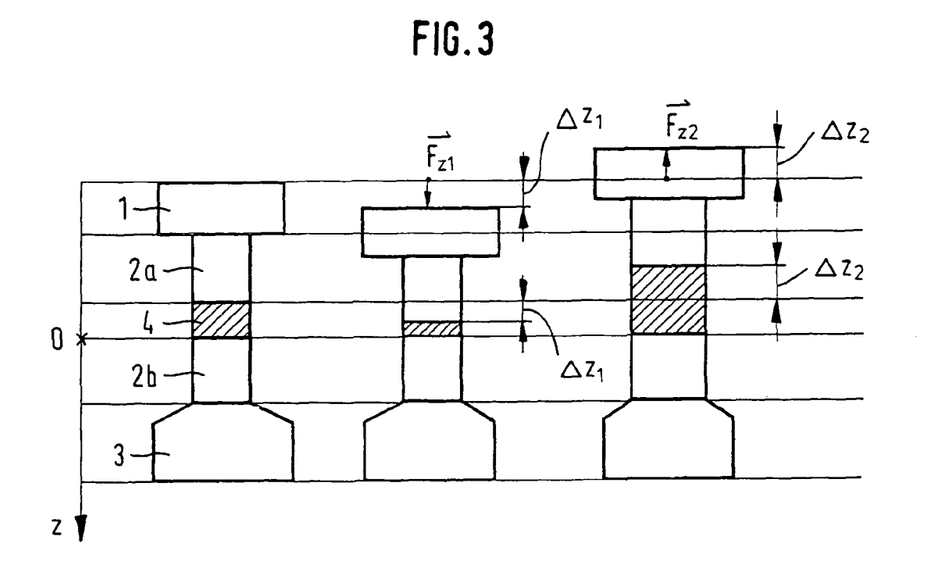
FIG. 3 illustrates a reduced diagrammatic representation of the device depicted in FIG. 2a to explain the operation of the device according to the invention.

The action principle of the actuator device 4 arranged on the connection element 2 will now be explained in more detail in connection with FIG. 3. FIG. 3 shows the device according to the invention shown in FIG. 2a in greatly abstracted form. The oscillating first body, the connection element, the actuator device attached to the connection element, and the second body are shown in FIG. 3 with the same reference numbers as before. To simplify the following explanation, it is assumed that the first body performs only a longitudinal oscillation, i.e., an oscillation in the z direction. The state shown on the left in FIG. 3 shows the starting position in which the first body 1 is first at rest. The state shown in the center image of FIG. 3 shows a snapshot of the first body oscillating in the z direction, whereby the oscillating first body 1 is displaced by the amount $\Delta z_1$ in the positive z direction (i.e., in FIG. 3 downwards) by a force $Fz_1$ acting in the positive z direction. With the first body 1 the upper section 2a of the connection element is likewise displaced in the positive z direction by the same amount $\Delta z_1$. The function of the actuator device 4 is now to follow this movement such that no forces or moments are transmitted into the lower section 2b of the connection element and thus to the second body 3. To this end the actuator device performed an elastic deformation equivalent to the movement of the first body. In other words, the actuator device is activated by the force effect $Fz_1$ in the positive z direction such that it contracts by the same amount $\Delta z_1$. Thus the force introduced into the upper section 2a of the connection element through the oscillation movement of the first body is effectively compensated and not passed on to the lower area 2b of the connection element. This can be seen in FIG. 3 by the fact that the zero position of the lower connection element section 2b is unchanged. The lower section 2a—and thus also the second body 3—remains at rest, so that the oscillation movement of the first body is effectively insulated from the second.

If now the force $F_{z2}$ transmitted from the oscillating body to the connection element section 2a acts in the opposite direction (i.e., in the negative z direction or, in FIG. 3, upwards), this leads to a corresponding displacement of the first body and of the upper connection element section. This displacement is labeled $\Delta z_2$ in the right-hand image of FIG. 3 that in turn shows a snapshot. At the same time the actuator device expands in the z direction by the same amount $\Delta z_2$ in order to follow the movement of the first body by an equivalent change in length. Analogous to the displacement shown in the center image of FIG. 3, here too the zero position of the lower connection element section and that of the second body 3 remain unchanged. Due to the effective oscillation insulation, no oscillations are transmitted to the second body here either.

The change in length of the actuator device should be considered in an analogous mariner when the oscillation transmitted from the oscillating first body to the connection element is a transversal or torsional oscillation. With a transversal oscillation the change in length of the actuator device occurs only crosswise to the longitudinal direction of the connection element, thus in the x and/or y direction. To compensate for a torsional oscillation, the actuator device is preferably arranged obliquely to the longitudinal direction of the connection element. Of course, an oscillation movement that contains several of the oscillation forms referred to can be compensated for through a corresponding arrangement of several actuators or through a suitable control of the actuator device.

Figure 4:
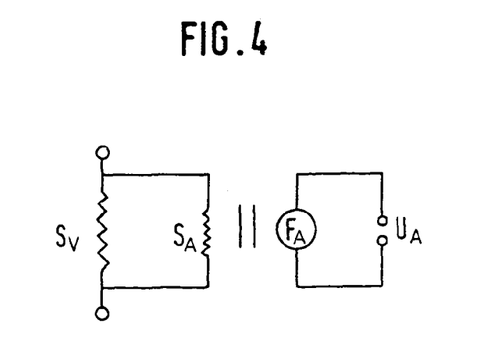
FIG. 4 illustrates an equivalent-circuit diagram for the connection element with actuator device.

For further explanation reference is made in addition to FIG. 4, which shows an equivalent-circuit diagram for the connection element with actuator device. The rigidity of the connection element is therein labeled $S_V$ and that of the actuator device $S_A$. The rigidity of the actuator device can be varied by a corresponding control of the actuator, which is represented in the equivalent-circuit diagram by a corresponding transformer. The transformer varies the rigidity of the actuator device, e.g., due to a corresponding excitation voltage $U_A$. Thus the change in length described in connection with FIG. 3 according to Hooke's law can also be described by a corresponding adjustment of the rigidity (and thus of the modulus of elasticity). The important fact in connection with both FIG. 4 and FIG. 5 is that the actuator device form a section in the transmission path, whereby this section performs the elastic deformation. The connection element itself is thus acted on with as few introduced forces as possible.

The actuator device comprise typically electrostrictive, magnetostrictive, electromagnetic or electromotive material. It is particularly preferred for actuator device of stack-shaped piezo elements to be used. The change in length of the piezo element is thereby caused in a known manner by applying a corresponding voltage $U_A$. The regulation of the actuator device takes place according to the invention in that the sensor unit 5 arranged in the interface area of connection element 2 and the second body 3 first detects a measurable variable that is a gauge of whether or which forces and torsional moment exist at the interface between the connection element 2 and the second body 3. On the basis of this measurement, a measuring signal is sent to the regulator unit that then issues a correcting variable to the actuator device 4. This means that the regulator unit 6 issues a correcting variable to regulate the actuator device 4 as a function of the measuring signal measured by the sensor unit 5. This cycle is repeated several times until the signals measured at the sensor unit 5 are minimal; i.e., the regulation is based on a zero regulation of the measurable variable detected at the sensor unit. Ideally the measurable variable measured at the sensor unit equals zero, which is synonymous with the fact that the second body is held with zero force by the connection element and the oscillation movement of the first body is effectively insulated.

Various embodiments of the connection element and the actuator device arranged thereon are described below on the basis of FIGS. 5 and 6. Typically the connection element is embodied as a pipe-shaped or rod-shaped strut. A pipe-shaped strut is advantageous in view of the associated reduction in weight. On the other hand, rod-shaped struts are preferred when great strength is necessary in order, e.g., to hold bodies of large mass. The embodiments shown in FIG. 5 respectively relate to a pipe-shaped connection element and those in FIG. 6 to a rod-shaped connection element.

First to the embodiments according to FIG. 5. In the first embodiment (FIG. 5*a*) the actuator device 4 are attached on the outer circumferential surface and/or inner circumferential surface of the pipe-shaped connection element 2, whereby only the attachment to the outer side can be seen in FIG. 5*a*. The actuator device can be divided by sections, as is indicated, e.g., by dashed lines in FIG. 5*a*. Likewise the actuator device can be embodied by sections as shown in diagrammatic form in FIG. 5*b*. It should thereby be taken into consideration that the actuator device is embodied aligned or controllable in corresponding spatial directions such that they are suitable for compensating for the oscillation movement by elastic length direction in corresponding spatial direction, as described in connection with FIG. 4. The actuator device according to FIG. 5*a* and *b* are thereby typically attached to the connection element by adhesion or by sputtering. Of course other suitable means for attachment can also be used. An embodiment according to FIG. 5*a* and *b* is particularly advantageous due to the small dimensions of the actuator device. Moreover, this type of embodiment is suitable for retrofitting already existing struts with such actuator device.

According to another embodiment (FIG. 5*c*) the actuator device is arranged on the connection element via respective driven elements 12. In the embodiment shown in FIG. 5*c*, only two actuator device is shown which are aligned in the longitudinal direction (i.e., in the z direction). Of course, several such actuator device with driven elements can be arranged on the connection element on the outer and/or inner side (not shown) both in longitudinal direction and in transversal direction, as well as obliquely.

Figure 5A:
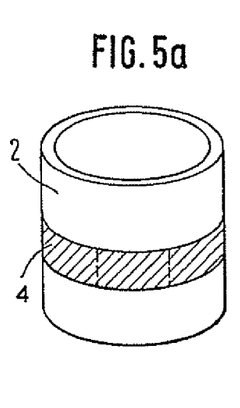
FIGS. 5a-5e illustrate various embodiments of a pipe-shaped connection element with actuator device arranged thereon.
Figure 5B:
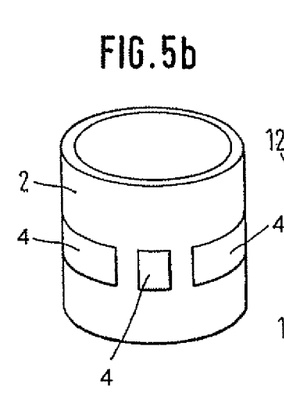
Figure 5C:
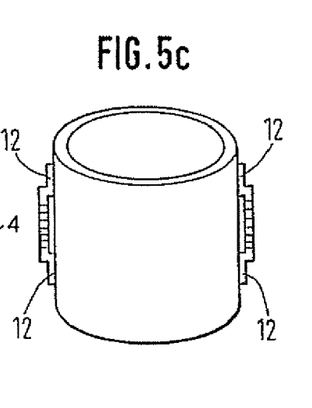
Figure 5D:
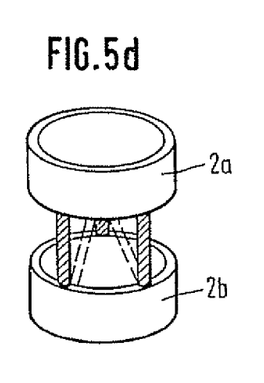

In addition to attaching the actuator device to the connection element, contrary to previous opinion, an integration of the actuator device into the connection element is possible. To this end, e.g., as shown in FIG. 5*d*, actuator device embodied in a rod-shaped manner are arranged between the upper 2*a* and the lower 2*b* area of the connection element. The actuator device thereby connect the upper 2*a* and the lower area 2*b* of the connection element in a force-locking manner. Of course, here too several such actuator device can be used. Likewise the alignment of the actuator device can vary regarding the longitudinal direction of the connection element. In FIG. 5*d*, for example, an oblique arrangement of the actuator device is shown by dashed lines. As explained in connection with FIG. 4, this arrangement is used to compensate for torsional oscillations. In addition, an actuator device in spiral form (not shown) can also be arranged between the upper 2*a* and the lower 2*b* section of the connection element.

Figure 5E:
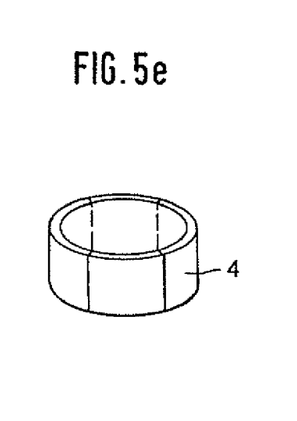
Figure 6A:
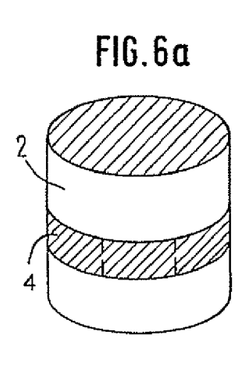
FIGS. 6a-6e illustrate various embodiments of a rod-shaped connection element with actuator device arranged thereon.
Figure 6B:
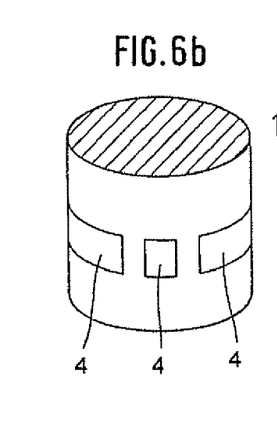
Figure 6C:
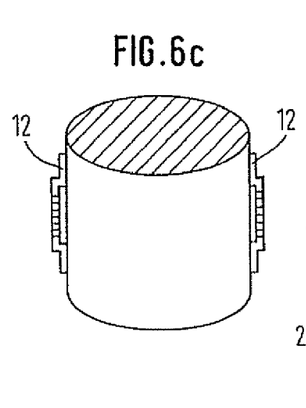
Figure 6D:
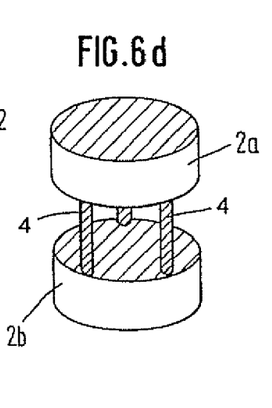
Figure 6E:
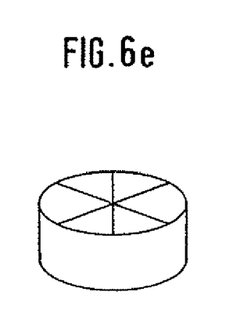

In order to increase the strength and thus the cohesion of the connection element, an embodiment according to FIG. 5*e* also presents itself. This image shows only the actuator device that is embodied in an annular manner and subdivided into different segments 4*a*. This actuator device is integrated into the connection element 2 such that it is arranged between the areas 2*a* and 2*b* shown, e.g., in FIG. 5*d* and connects them to one another in a force-locking manner. The different sections 4*a* of the actuator device shown in FIG. 5*e* can be controlled separately like the actuator device described in connection with the previous illustrations, in order to perform a respective change in length in corresponding spatial directions.

Corresponding arrangements are also possible for rod-shaped connection elements as shown in the embodiments according to FIG. 6. FIG. 6*a* shows an embodiment analogous to FIG. 5*a* in which actuator device is arranged on the outside of the rod-shaped connection element 2. The same means are used for attachment as in the embodiment according to FIG. 5*a*. The same applies to an embodiment by sections or a subdivided embodiment according to FIG. 6*b*. FIG. 6*c* shows an embodiment in which the actuator device is arranged on the connection element via driven elements in a spaced manner, analogous to the embodiment according to FIG. 5*c*. Furthermore, an arrangement of the actuator device inside the connection element is also possible with a rod-shaped connection element. Thereby, e.g., analogous to the embodiment according to FIG. 5*d*, actuator device arranged by sections are provided which connect the upper area 2*a* and the lower area 2*b* of the connection element to one another in a force-locking manner. As in the case of a pipe-shaped connection element, the actuator device can thereby be arranged in oblique or spiral-shaped form in order to compensate for all possible oscillation forms (longitudinal, transversal and torsional oscillation) accordingly. Since in most cases bodies with large masses must be held by the connection element, it is particularly advantageous to embody an entire section of the connection element as actuator device (FIG. 6*e*). The actuator device can thereby be embodied in a segment-shaped manner as shown in diagrammatic form in the right-hand illustration of FIG. 6*e*. Such an embodiment proves to be particularly advantageous in that in this manner the cross section of the connection element on the one hand is used in an optimal manner for the elastic deformation to be performed; on the other hand such a connection element has an adequate rigidity without resulting in damage to the actuator device.

As with the embodiments according to FIG. 5, the actuator device with the embodiments according to FIG. 6 are embodied by sections or in a subdivided manner. Alternatively, the individual actuator device can be controlled individually. In this manner it is ensured that the actuator device respectively perform a change in length in the corresponding spatial direction to compensate for the oscillation movement of the first body.

Figure 7:
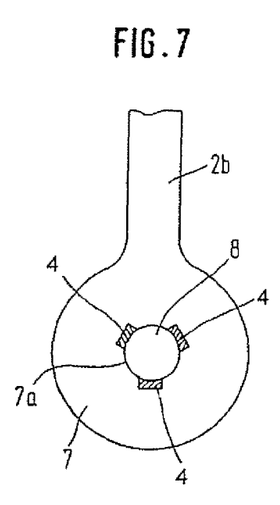
FIG. 7 illustrates a section of a connection element with attachment eye.

FIG. 7 shows a further embodiment of the connection element. FIG. 7 shows only the area of the connection element that is connected to the second body. To this end the connection element is embodied as an attachment eye 7 in its lower area 2*b*. The connection element 2 is attached to a correspondingly shaped end of the second body 3 via the attachment eye 7 with a bolt arrangement 8. The attachment of the second body 3 to the connection element 2 by means of a bolt arrangement 8 can likewise be seen from the sectional view of the transitional area of the connection element and second body in FIG. 8.

Figure 8:
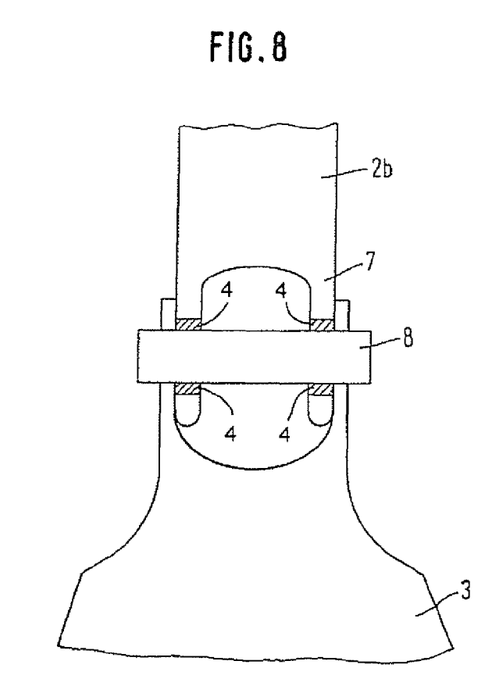
FIG. 8 illustrates a sectional view of the connection element depicted in FIG. 7 with attachment eye.

According to a further embodiment, the actuator devices 4 are arranged on the inner circumferential surface 7*a* of the attachment eye 7 such that they surround the bolt connection 8 inserted for attaching the second body 3 in an unhindered mariner. In the embodiment shown in FIG. 7, only three actuator devices 4 are shown. Of course, a plurality of actuator device can also be used. As in the embodiments already described in connection with FIGS. 5 and 6, it is essential that the actuator device is arranged in a suitable manner in order to compensate for the oscillation movement of the first body depending on the degrees of freedom of the oscillation movement of the first body by corresponding changes in length in the respective spatial direction. The embodiment according to FIG. 7 or 8 is advantageously characterized in particular by a small space requirement.

Figure 9:
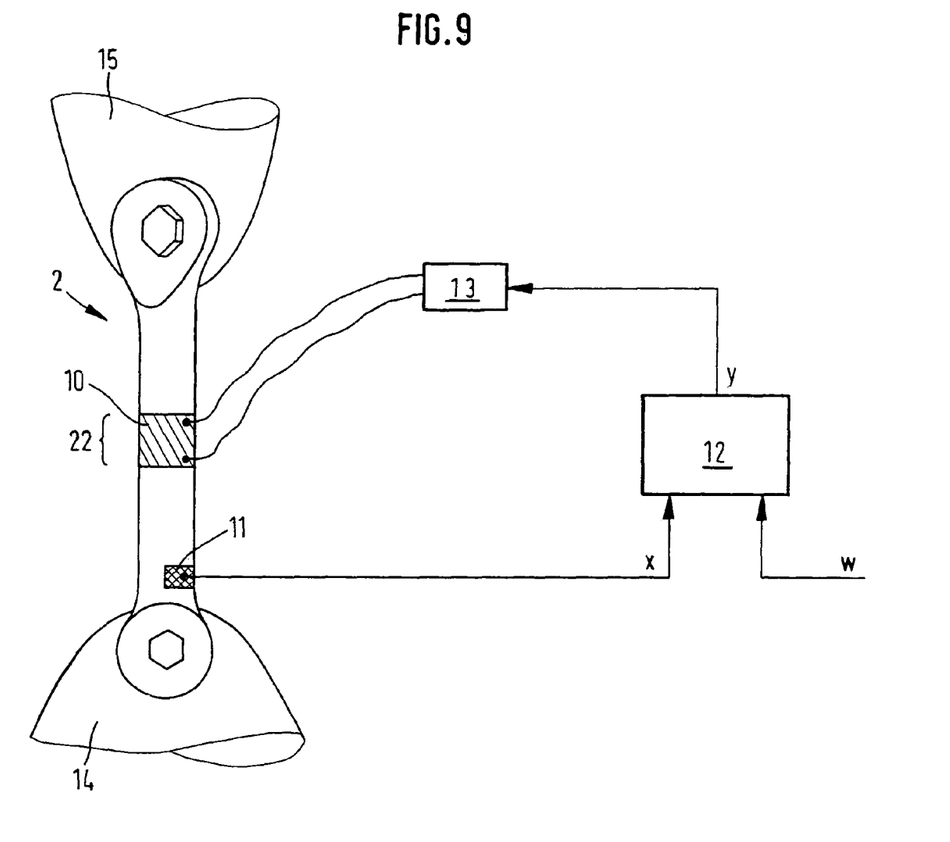
FIG. 9 illustrates regulating structure of the regulator device for a piezo actuator of a strut.

It should be noted that the device described above and the method for oscillation insulation is concretely inserted in a strut of a helicopter. As described at the outset, it is hereby important to avoid the oscillations generated by the main transmission gear or engine, rotor and auxiliary units by the transmission to the cell structure of the cockpit by means of struts. Through the invention it is possible to effectively block the transmission path of the strut for the structure-borne noise generated by gearings, engine, rotor or auxiliary units. This is achieved by a corresponding control of the actuator device arranged on the strut so that the area of the strut fixedly connected to the main transmission gear follows the movement of the main transmission gear such that the suspension of the cell structure takes place with zero force. To this end FIG. 9 shows a possible regulation structure. The strut 2 has piezo actuators 10 arranged in a section 22. A measuring signal (controlled variable x) is transmitted from a measuring element 11 (e.g., acceleration pickup, strain gauge) to a regulator device 12. This measuring signal is a fault signal, for ideally the measuring signal should be virtually zero. The desired value W of the regulator device 12 is therefore virtually a zero value. If a fault signal is recognized by the regulator device 12, on the basis of a corresponding control algorithm an output signal is formed in amplitude and phase angle that is issued to a final control element 13 and is suitable for generating an equivalent reaction of an elastic deformation. This final control element 13 controls the electric voltage to contract or expand the piezo actuator 10. This produces the elastic deformation of the strut 2.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for oscillation insulation in a transmission path, comprising
    a first body structured and arranged to undergo an oscillation movement;
    at least one rigid connection element
    a second body connected to said first body via said at least one rigid connection element;
    an actuator device attached to said at least one connection element; and
    a sensor unit arranged at an interface between said at least one connection element and the second body; and
    a regulator unit, connected to said sensor unit, being arranged to control said actuator device to perform an elastic deformation equivalent to an oscillation movement of said first body.

2. The device in accordance with claim 1, wherein the elastic deformation comprises at least one section of the connection element being changeable in form to follow the oscillation movement of said the first body, whereby the oscillation movement of said first body is effectively insulated from said second body.

3. The device in accordance with claim 1, wherein said actuator device is controllable by said regulator unit as a function of an output of said sensor unit.

4. The device in accordance with claim 1, wherein the oscillation movement of said first body comprises several degrees of freedom.

5. The device in accordance with claim 1, wherein said actuator device forms a section in the transmission path between said first and said second body.

6. The device in accordance with claim 5, wherein the section in the transmission path performs the elastic deformation.

7. The device in accordance with claim 1, wherein said actuator device is formed to be actively moveable in at least one spatial direction according to the degrees of freedom of the oscillation movement of said first body.

8. The device in accordance with claim 7, wherein the deformation of said actuator device corresponds to a change in length in a corresponding spatial direction.

9. The device in accordance with claim 1, wherein said connection element is formed as one of a pipe-shaped or rod-shaped strut.

10. The device in accordance with claim 9, wherein said connection element comprises an attachment eye at least in said interface area to said second body.

11. The device in accordance with claim 10, wherein said connection element is connected to said second body at said attachment eye via a bolt arrangement.

12. The device in accordance with claim 10, wherein said actuator device is arranged on an inner circumferential surface of said attachment eye.

13. The device in accordance with claim 9, wherein said connection element comprises a pipe-shaped connection element and said actuator element is arranged on at least one of an outer and an inner circumference of said pipe-shaped connection element by at least one of adhesion or sputtering.

14. The device in accordance with claim 9, wherein said connection element comprises a rod-shaped connection element and said actuator device is arranged on an outer circumference of said rod-shaped connection element by at least one of adhesion or sputtering.

15. The device in accordance with claim 9, wherein said connection element comprises a pipe-shaped connection element and said actuator element is arranged on at least one of an outer and an inner circumference of said pipe-shaped connection element via respective driven elements.

16. The device in accordance with claim 9, wherein said connection element comprises a rod-shaped connection element and said actuator device is arranged on an outer circumference of said rod-shaped connection element by via respective driven elements.

17. The device in accordance with claim 1, wherein said actuator device is integrated into said connection element.

18. The device in accordance with claim 1, wherein said actuator device comprises sections or is subdivided.

19. The device in accordance with claim 1, wherein said actuator device is controllable by sections.

20. The device in accordance with claim 1, wherein said actuator device is arranged at least one of parallelly, perpendicularly and obliquely to a longitudinal direction of said connection element.

21. The device in accordance with claim 1, wherein said actuator device is composed of one of an electrostrictive, magnetostrictive, electromagnetic or electromotive material.

22. The device in accordance with claim 1, wherein said actuator device comprises a stack-shaped piezo actuator.

23. The device in accordance with claim 1, wherein said sensor unit comprises one of an acceleration or expansion sensor.

24. A process for oscillation insulation in a transmission path between a first body undergoes an oscillation movement and a second body connected to the first body by at least one rigid connection element, said process comprising:
   detecting a controlled variable through a sensor unit arranged at an interface between the connection element and the second body;
   transmitting the controlled variable to a regulator unit; and
   performing an elastic deformation equivalent to the oscillation movement of the first body, whereby the form of the connection element is changeable in one section in order to follow the movement of the first body.

25. The process in accordance with claim 24, further comprising repeating the detecting, transmitting, and elastic deformation performance until the controlled variable detected by the sensor unit is virtually zero, whereby the oscillation movement of the first body is effectively insulated from the second body.

26. The process in accordance with claim 24, wherein the elastic deformation comprises regulating an actuator device with a corresponding correcting variable that is a function of the controlled variable.

27. The process in accordance with claim 24, wherein the actuator device is arranged on the at least one connection element.

28. The process in accordance with claim 24, wherein the controlled variable detected by the sensor unit is a gauge of the oscillation movement transmitted from the first body to the second body via the connection element.

29. The process in accordance with claim 24, wherein the transmission path is formed by at least one strut that connects a main transmission gear of a helicopter to an upper side of a cell structure of a cockpit.

30. The process in accordance with claim 29, further comprising arranging an adjustable piezo actuator on the at least one strut as the actuator device, wherein an elastic deformation equivalent to the oscillation movement of the main transmission gear is carried out in one section of the strut by the adjustable piezo actuator.

31. The process in accordance with claim 30, wherein the adjustable piezo actuator is arranged on a surface of the strut along a circumferential direction.

32. The process in accordance with claim 29, wherein the section is formed between two driven elements of a piezo actuator arranged in an axial direction of the strut.

33. The process in accordance with claim 29, wherein the section of the strut is formed by a piezo actuator.

34. The process in accordance with claim 29, further comprising:
   integrating a piezo actuator into the at least one strut in an axial as the actuator device; and
   locating a measuring element of the regulator unit in an area of the strut between the piezo actuator and an interface to the cell structure.

35. An apparatus structured and arranged to perform the process in accordance with claim 24, wherein the sensor unit is located in an interface area between the connection element and the second body, and the regulating unit is connected to the sensor unit.

36. A process for oscillation insulation in the device in accordance with claim 1, said process comprising:
   detecting a controlled variable in the interface of the connection element and the second body; and
   performing an elastic deformation equivalent to the oscillation movement of the first body, whereby the form of the connection element is changeable in one section in order to follow the movement of the first body.

37. The process in accordance with claim 36, further comprising repeating the detecting and elastic deformation performance until the detected controlled variable is virtually zero, whereby the oscillation movement of the first body is effectively insulated from the second body.

* * * * *